United States Patent [19]

Shields

[11] Patent Number: 4,499,353
[45] Date of Patent: Feb. 12, 1985

[54] BLISTER PACKAGE

[75] Inventor: Thomas A. Shields, Bourne, Mass.

[73] Assignee: USM Corporation, Farmington, Conn.

[21] Appl. No.: 470,067

[22] Filed: Mar. 3, 1983

[51] Int. Cl.³ .............................................. B65D 73/00
[52] U.S. Cl. .................................... 206/470; 220/306; 220/352; 220/467
[58] Field of Search ................ 206/470, 467; 220/306, 220/352

[56] References Cited

U.S. PATENT DOCUMENTS

| | | | |
|---|---|---|---|
| 3,111,220 | 11/1963 | Bostrom | 206/470 |
| 3,463,309 | 8/1969 | Szostek | 206/470 |
| 4,016,972 | 4/1977 | Szamborski | 206/470 |
| 4,319,684 | 3/1982 | Backman et al. | 206/470 |

Primary Examiner—Joseph Man-Fu Moy
Attorney, Agent, or Firm—Alan N. McCartney

[57] ABSTRACT

A reusable container formed from a transparent material and having hinged top and bottom portions, the bottom portion have a flange formed with an circumferentially disposed inverted U-shaped shoulder merging into an enlarged article carrying section. The top portion having a flange with a recessed area of the same dimension as the inverted U-shaped shoulder and adapted to frictionally interlock onto the shoulder of the bottom portion. The shoulder is adapted to be received through the opening in a display panel so that the panel is sandwiched between the flanges of the top and bottom portions of the container. The flanges also having frictionally interlocking embossments at their upper ends opposite the hinge.

2 Claims, 3 Drawing Figures

BLISTER PACKAGE

BACKGROUND OF THE INVENTION

This invention relates to a reusable container known in the trade as a blister package. The container is formed of a thin sheet of plastic, vacuum formed or molded to have an article carrying section and a top for enclosing the article carrying section. The entire package is most often used with a display card or panel for identifying the contents, source etc. of the package. The container is used for carrying a plurality of small articles such as tacks or nails and the display card will have an opening for mounting on a hook. These containers are intended to be reused, that is, the top being removed from the article carrying section for removal of an article and then replaced to store the remaining articles for future use.

STATEMENT AS TO PRIOR ART

In recent years there have been a number of blister packages available that are purportedly reuseable, however, their design is such that invariably the package is destroyed once it is opened. This is caused by the package being either glued or stapled to a display card, which when the package is removed from the display card, causes the package to be destroyed. An example of this container is shown in U.S. Pat. No. 3,394,801. Further, a number of such packages are not a one piece construction with the top hinged to the bottom article carrying section. An example of such a package is illustrated in U.S. Pat. No. 4,091,927. Other types of packages do not contain a top with an article carrying section. These types of containers are illustrated in U.S. Pat. Nos. 3,463,309 and 4,319,684.

SUMMARY OF THE INVENTION

It is an object of this invention to provide a reusable container having an article carrying bottom portion adapted to be received through the opening in a display card with a top portion hinged to a bottom portion and having a recessed area frictionally fit to the bottom portion to sandwich the display card between the top and bottom portions of the container.

It is a further object of this invention to provide flanged areas surrounding the top and bottom portions of a reusable container which are positioned against the opposite sides of a display card, with the flanged portions having a frictional interlocking means to secure the display card between the top and bottom portions of the container.

It is an additional object of this invention to provide the flanges of the top and bottom portions of a reusable container with opposed offset extensions for gripping by the user to facilitate separation of top and bottom portions to permit access to the interior of container.

DESCRIPTION OF THE PREFERRED EMBODIMENT

Figure 1:
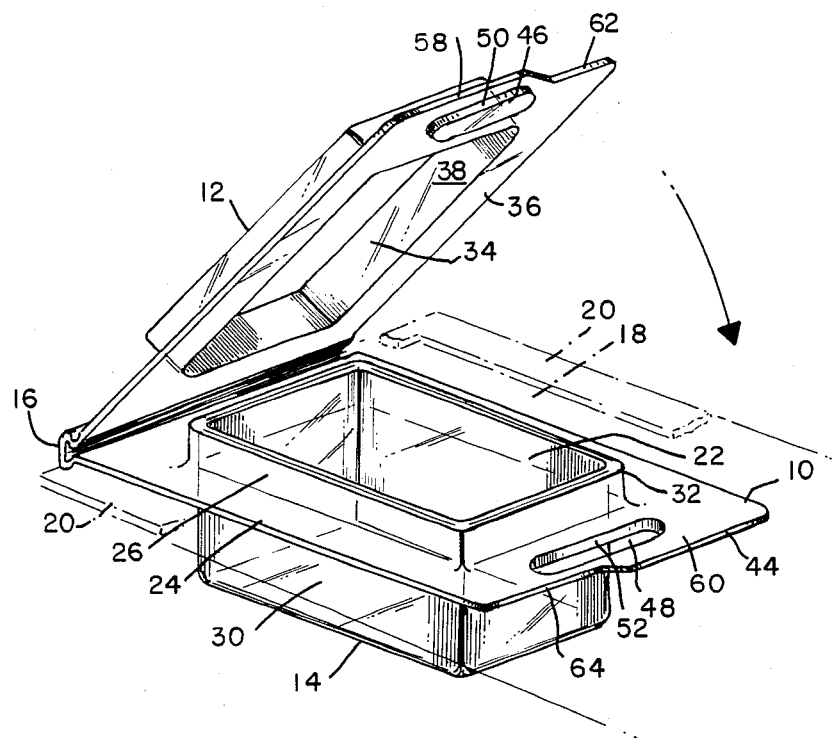
FIG. 1 is a perspective view of the reusable container of this invention with the container being shown open and the display card in phantom lines.

The reusable package or container 10 of this invention is formed by vacuum forming or molding a piece of transparent plastic type material into a resilient top portion 12 and bottom portion 14 hinged together at 16 at one end of the package. The hinge connection 16 secures the top and bottom portions together so they will not separate when the container is opened, thus enabling the user to more readily remove an article from the container. The top and bottom portions 12, 14 are adapted to be fit together through an opening 18 in a display card 20 or panel that carries indicia relating to the contents of the container, manufacturer etc., and acts as a carrier for the package.

The bottom portion 14 is formed with a substantially rectangular opening 22 having a circumferentially disposed flange 24. The flange is folded outwardly at 26 and then inwardly at 28 to form a recessed article carrying section 30 substantially the same shape as the opening 22. The outward and inward folds 26 and 28 form an inverted U-shaped section 32 which forms an outwardly extending, resilient shoulder surrounding the opening 22.

The top portion 12 has a recessed cavity area 34 formed with a flange 36 extending outwardly from the perifery of the cavity. The recessed area 34 is the same configuration as the shoulder 32 and has a depth which is slightly less than the depth of the fold 26 (see FIG. 3) for reasons that will become apparent hereinafter. It can thus be seen that the top and bottom portions are adapted to mate so that the surface 38 of the top portion 12 resiliently frictionally interfits against fold 26 to frictionally lock the two portions of the container together. Further, with this type of interlocking, the recess 34 provides additional internal area to the container for housing additional articles.

With the container thus far described, the folded areas 26 and 28 are spaced at 40 from one another around the circumference of the opening 22. This enables folded area 26 to be sufficiently flexible to be forced slightly inward upon application of the top portion to load the fold 26 against recessed area 34 to lend additional strength to the resilient frictional interlocking of the top and bottom portions of the container.

Figure 2:
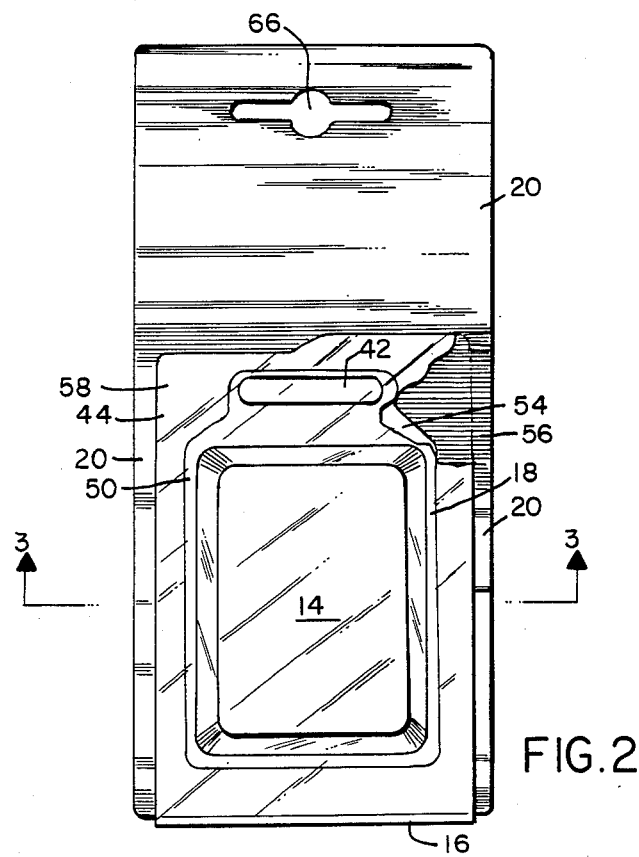
FIG. 2 is an elevational view of the reusable container mounted to the display card with upper locking flanges broken away to illustrate the opening in the card.
Figure 3:
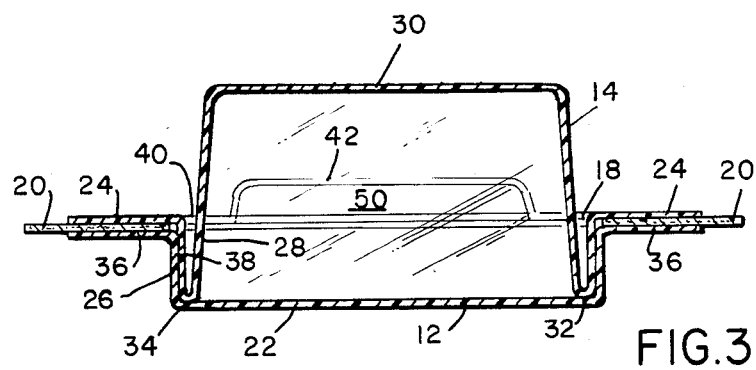
FIG. 3 is a sectional view taken along the line 3—3 of FIG. 2 to illustrate the frictional interlock of the top and bottom portions of the container.

Attention is now directed to FIGS. 2 and 3 which illustrate the display panel 20 being carried by the container. The opening 18 in panel 20 is the same general configuration as the fold 26 on the bottom portion 14 and the fold 26 is adapted to be inserted through opening 18 until the panel abuts the underside of flange 24. Thereafter, as the top portion 12 is positioned over the bottom portion 14 and the fold 26 received into recess 34, the flange 36 will abut the panel 20 to sandwich the panel between the flanges 24 and 36 to lock the panel between the top and bottom portions of the container. Also, the hinged area 16 is formed out of the plane of flanges 24 and 36 as illustrated in FIG. 1 to enable the flanges to separate slightly to accommodate the thickness of the panel 20 and at the same time permitting complete closure of the top portion onto the bottom portion.

Additional locking means 42 is also provided between the top and bottom portions at one end 44 of the container. The top portion 12 has a raised embossed area 46 that mates with a recessed embossed area 48 in the bottom portion 14. The areas 46 and 48 are enlongated slot shaped members that provide a substantial surface area contact at 50, 52 between the areas 46, 48 to provide a substantial locking engagement to assist in the frictional interlocking engagement of the top and bottom portions of the container.

Attention is also directed to the configuration of the opening 18 in panel 20 at the upper area of the panel opening. The opening 18 (see FIG. 2) has a reduced area 54 which receives the locking means 42 but still provides a substantial surface area 56 on the panel against which the enlarged flanges 58 of the top and bottom portions of the container can contact the panel.

Attention is now directed to FIGS. 1 and 3 which illustrate tabs or extensions 58, 60 on the upper end 44 of the top and bottom portions 12 and 14 respectively. The tabs 58 and 60 are offset from one another and have relieved areas 62, 64 which enables the tabs or extension 58, 60 to be readily gripped by the user to separate the top and bottom portions to open the container.

The display panel 20 can also have an appropriately shaped opening 66 so that the container and panel can be hung on a hook for display and accessably to the user.

It can thus be seen that the reusable container of this invention has a hinged top and bottom section adapted to carry a display card or panel and which are frictionally interfit in two areas through an opening in the panel to lock the panel to the container. This type of container is inexpensive and easily manufactured and can be readily filled and assembled to the display panel. Further, the container can be easily opened and closed numerous times for accessibility to the articles carried in the container. Additionally, if desired the container can be easily stored with other similar containers after the display card has been removed.

I claim:

1. A reusable container that is adapted to be received in an opening in a display panel comprising:
   a. unitary top and bottom portions formed from a common piece of resilient transparent material, said top and bottom portions being secured together at one end by an integral hinge;
   b. said bottom portion having a circumferential flange with a circumferentially disposed folded area extending out of the plane of the flange which has a return fold forming an inverted U-shaped shoulder between said folded area and said return fold, said return fold being slightly spaced from said folded area and forming a continuous uninterrupted surface merging into an enlarged article carrying section disposed out of the plane of said flange opposite said inverted U-shaped shoulder, said article carrying section being the same geometric configuration as said folded area;
   c. said top portion having a flange and a recessed area formed out of the plane the flange and being substantially the same circumference as said circumferentially disposed folded area and adapted to be received about said folded area to frictionally interfit said recessed area to said folded area;
   d. said top and bottom portions opposite the end of said hinge having locking means comprising a protruding embossment on the flange of one of said portions adapted to lock into a recessed embossment on the flange of the other of said portions;
   e. said top and bottom portion flanges having offset protruding tabs that can be grasped to facilitate separation of the top and bottom portion to permit access to the interior of the container; and
   f. said U-shaped shoulder being adapted to be positioned through an opening in a display panel with the flanges of the top and bottom portions abutting opposite surfaces of the panel.

2. The container of claim 1 wherein said protruding embossment is in the flange of said top portion and said recessed embossment is in the flange of said bottom portion.

* * * * *